United States Patent
Alman et al.

(10) Patent No.: US 9,930,426 B2
(45) Date of Patent: *Mar. 27, 2018

(54) SYSTEM AND METHOD FOR PROVIDING LOCATION-DEPENDENT EMERGENCY ALERT SERVICES

(71) Applicant: AT&T INTELLECTUAL PROPERTY I, L.P., Atlanta, GA (US)

(72) Inventors: Douglas Alman, San Marcos, CA (US); Charles D Turner, Jr., San Diego, CA (US); Brian Wilson, Johnston, IA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/614,027

(22) Filed: Jun. 5, 2017

(65) Prior Publication Data

US 2017/0272837 A1 Sep. 21, 2017

Related U.S. Application Data

(63) Continuation of application No. 14/678,132, filed on Apr. 3, 2015, now Pat. No. 9,706,263.

(51) Int. Cl.

| | |
|---|---|
| *H04N 7/10* | (2006.01) |
| *H04N 21/81* | (2011.01) |
| *H04N 21/414* | (2011.01) |
| *H04N 21/258* | (2011.01) |
| *H04H 20/59* | (2008.01) |
| *H04N 21/45* | (2011.01) |
| *H04H 60/51* | (2008.01) |
| *H04N 21/4788* | (2011.01) |

(52) U.S. Cl.
CPC .......... *H04N 21/814* (2013.01); *H04H 20/59* (2013.01); *H04H 60/51* (2013.01); *H04N 21/25841* (2013.01); *H04N 21/41407* (2013.01); *H04N 21/4524* (2013.01); *H04N 21/4788* (2013.01)

(58) Field of Classification Search
CPC ............ H04N 21/814; H04N 21/4524; H04N 21/25841; H04N 21/41407; H04N 21/4788
USPC ......................................................... 725/33
See application file for complete search history.

(56) References Cited

U.S. PATENT DOCUMENTS

| | | | |
|---|---|---|---|
| 7,602,277 B1 | 10/2009 | Daly et al. | |
| 7,681,215 B2 | 3/2010 | Kim | |

(Continued)

*Primary Examiner* — Michael B Pierorazio
(74) *Attorney, Agent, or Firm* — Guntin & Gust, PLC; David Terrell

(57) ABSTRACT

Aspects of the subject disclosure may include, for example, a device that performs operations including receiving user input associated with a group of emergency alert service messages, assigning a plurality of severity codes to the group of emergency alert service messages according to the user input, each of the plurality of severity codes indicating a presentation format, determining a first location of a mobile communication device, determining a second location of a premises of a user of the mobile communication device. The operations can also include, responsive to detecting a first emergency alert service message associated with the first location, determining a first severity code of the plurality of severity codes assigned to the first emergency alert service message and providing the first emergency alert service message to the mobile communication device for presentation in a first format according to the first severity code. Other embodiments are disclosed.

20 Claims, 7 Drawing Sheets

(56) References Cited

U.S. PATENT DOCUMENTS

| | | | |
|---|---|---|---|
| 8,250,598 | B2 | 8/2012 | Velazquez |
| 8,532,607 | B2 | 9/2013 | Sennett et al. |
| 8,572,645 | B2 | 10/2013 | Kim et al. |
| 8,745,655 | B2 | 6/2014 | Reddy et al. |
| 2003/0216133 | A1 | 11/2003 | Poltorak |
| 2005/0086685 | A1 | 4/2005 | Rahman et al. |
| 2006/0234672 | A1 | 10/2006 | Adler |
| 2007/0047520 | A1 | 3/2007 | Byers et al. |
| 2009/0247110 | A1 | 10/2009 | Sennett et al. |
| 2009/0247116 | A1 | 10/2009 | Sennett et al. |
| 2011/0088058 | A1 | 4/2011 | Velazquez et al. |
| 2012/0102522 | A1 | 4/2012 | Long et al. |
| 2013/0219023 | A1 | 8/2013 | Surianarayanan et al. |
| 2013/0241726 | A1 | 9/2013 | Hunter et al. |
| 2013/0347031 | A1 | 12/2013 | Hasek et al. |
| 2014/0143801 | A1 | 5/2014 | Russell et al. |
| 2015/0016346 | A1 | 1/2015 | Bharatia et al. |
| 2016/0295300 | A1 | 10/2016 | Alman |

100

| User | Event Code | Severity Code | Action |
|---|---|---|---|
| A | Flood | High | Immediately Call |
| A | Tornado | Medium | Text |
| A | Fog | Low | Send email |
| B | Flood | High | Text |
| B | Rain | Low | Ignore |

SYSTEM AND METHOD FOR PROVIDING LOCATION-DEPENDENT EMERGENCY ALERT SERVICES

CROSS REFERENCE TO RELATED APPLICATIONS

This application is a continuation of and claims priority to U.S. patent application Ser. No. 14/678,132, filed Apr. 3, 2015 (now U.S. Patent Publication No. 2016/0295300). The contents of the foregoing are hereby incorporated by reference into this application as if set forth herein in full.

FIELD OF THE DISCLOSURE

The subject disclosure relates to providing location-dependent emergency alert services.

BACKGROUND

Various agencies, such as the Federal Communication Commission, the Federal Emergency Management Agency and the National Weather Services, seek to provide individuals with information concerning potential or active emergency situations. Emergency alert signals can provide messages warning of dangers or other situations of public concern. The emergency alerts are not limited to use by Federal agencies, and state or local agencies can also provide emergency alerts, such as AMBER alerts.

Over-the-top content (OTT) providers enable television viewers to view media content from any location where access to a wireless network (e.g., a high-speed Internet data services) exists. In some cases the user may be watching OTT content using a mobile device such as a smart phone, tablet, or laptop computer. In other cases, the OTT service may be provided via a non-mobile device such as a smart television or a home-electronics device (e.g., a network-enabled DVD player, game console, and so forth). Traditional television services (over-the-air, cable, and satellite) deliver Emergency Alert Service (EAS) alerts based on the user's local market area and EAS zone.

BRIEF DESCRIPTION OF THE DRAWINGS

Reference will now be made to the accompanying drawings, which are not necessarily drawn to scale, and wherein:

FIG. 3 depicts an illustrative embodiment of severity codes and related actions;

DETAILED DESCRIPTION

Figure 1:
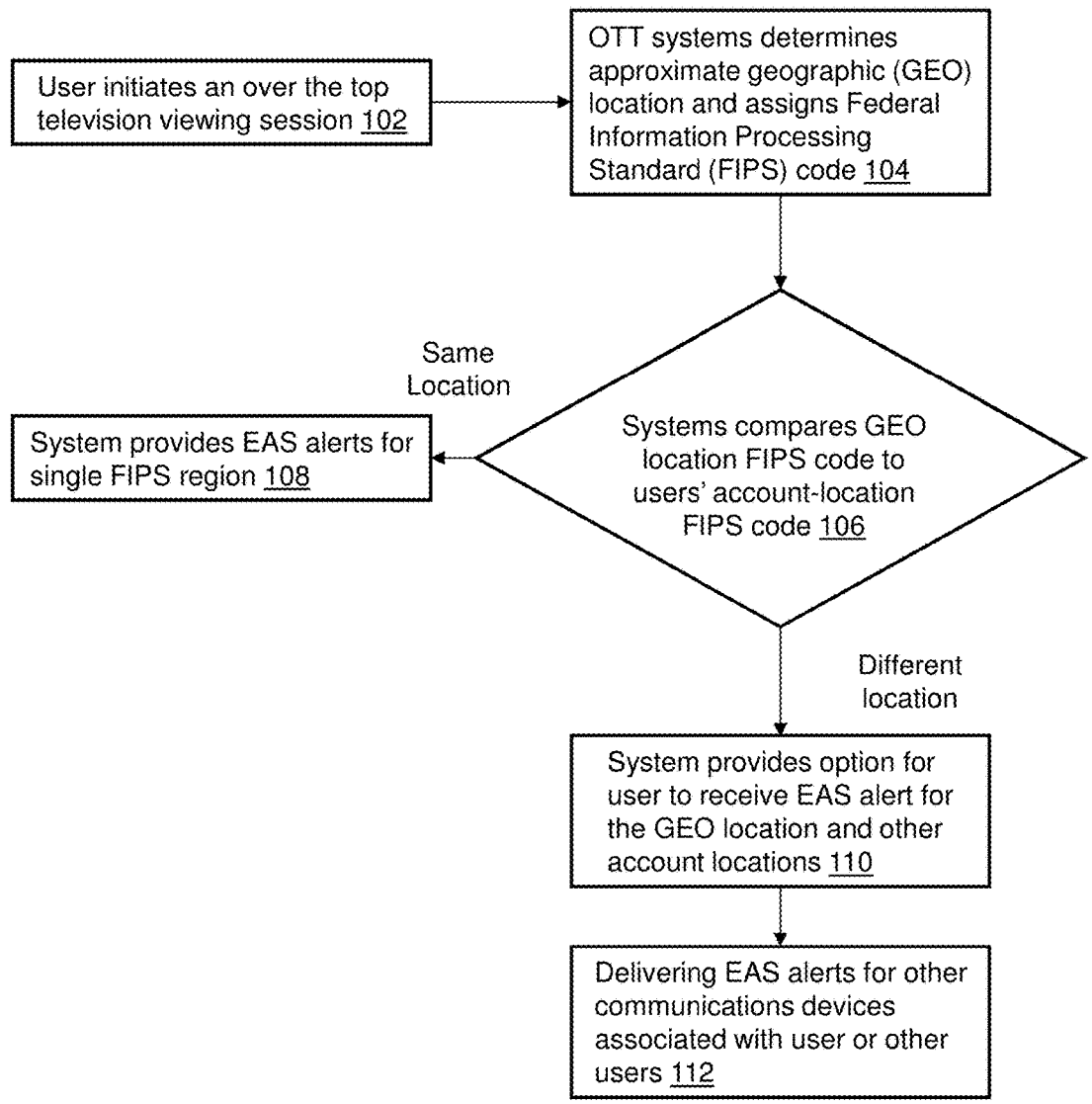
FIG. 1 depicts an illustrative embodiment of a method for delivering emergency alert messages during an over-the-top viewing session.

The subject disclosure describes, among other things, illustrative embodiments for providing and/or adjusting emergency alert messages, such as based on a severity of the alert. OTT services allow a user to consume media content from outside their local EAS zone, which is determined by Federal Information Processing Standards (FIPS) codes. Thus, a user of OTT services can receive alerts based on their geographic position rather than from the EAS zone of their subscription account (i.e., home location). One or more of the exemplary embodiments enable delivery of the EAS messages during the OTT communication session where the delivery and/or the presentation of the EAS message is adjusted according to severity codes. The severity codes can be selected or otherwise determined according to user input, such as by a user associated with the end user device providing the OTT service where the severity codes are stored by the network service provider.

Although EAS messages are available via wireless-device applications, EAS messages as jointly coordinated by the FCC, FEMA and NOAA are not currently regulated or delivered to OTT users viewing television content. EAS messages are encoded to include specific area message encoding (SAME) protocol. In the SAME system, EAS messages have four parts, the first and last being digital messages and the middle two are audio messages. The digital sections of a SAME message include the header and tail of the message. The audio sections include the attention signal and a message. The header of the EAS message includes various codes including an originator code, an event code, location codes, time codes, and various identifies for the message. The event code can include an event description (e.g., a "coastal flood warning" as event code "CFW"). The location codes can include a Federal Information Processing Standards (FIPS) state code and a FIPS county code. One or more of the exemplary embodiments can enable providing the EAS message or a representation of the EAS message via the OTT communication session utilizing some or all of the SAME protocol. Other embodiments are described in the subject disclosure.

One embodiment of the subject disclosure is a system including a memory that stores instructions and a processor coupled to the memory. The processor, responsive to executing the instructions, can perform operations that include receiving user input associated with a group of emergency alert service messages. The processor can assign a plurality of severity codes to the group of emergency alert service messages according to the user input, each of the plurality of severity codes indicating a presentation format, determine a first location of a mobile communication device, and determine a second location of a premises of a user of the mobile communication device. The operations can also include, responsive to detecting a first emergency alert service message associated with the first location, determining a first severity code of the plurality of severity codes assigned to the first emergency alert service message and providing the first emergency alert service message to the mobile communication device for presentation in a first format according to the first severity code. The system can also perform, responsive to detecting a second emergency alert service message associated with the second location and responsive to determining that the second location is remote from the first location: determining a second severity code of the plurality of severity codes assigned to the second emergency alert service message, and providing the second emergency alert service message to the mobile communication device for presentation in a second format according to the second severity code.

One embodiment of the subject disclosure is a method that includes determining a first location of a mobile communication device and a second location associated with a premises of a user of the mobile communication device and responsive to detecting an emergency alert service message associated with the second location and responsive to determining that the second location is different from the first location, determining a user assigned severity code for the emergency alert service message and providing the emergency alert service message to the mobile communication device for presentation during a communication session in a format according to the user assigned severity code.

One embodiment of the subject disclosure is a machine-readable storage device, including instructions, where responsive to executing the instructions, a processor of a mobile communication device performs operations including presenting media content received over a network during a communication session. The processor can receive, over the network, a first emergency alert service message associated with a first location of the mobile communication device, where the first location is remote from a second location of a premises of a user of the mobile communication device. The operations may further include presenting the first emergency alert service message during the communication session in a first format, where the first format is indicated in a first severity code that is assigned to the first emergency alert service message according to user input.

While exemplary embodiments of the invention described below are directed to forwarding of EAS messages to accounts associated with an OTT content presentation and the various accounts connected to the OTT service, other embodiments can exemplarily be provided outside of an OTT service. For example, any of the following methods can be performed via a stand-alone application or server. One or more of the exemplary embodiments can also be utilized to provide other types of information from other sources during the communication session, such as where the information is of public concern.

FIG. 1 depicts an illustrative embodiment of a method 100 for delivering emergency alert messages during a communication session, such as an OTT viewing session. Method 100 can begin at 102 in which a user commences or requests an OTT viewing session. The viewing session can be initiated at a home location (e.g., in proximity to the user's premises such as in the user's house or in the user's backyard) or while away from the home location (including while in transit or while at another location). In one embodiment, the OTT session can be provided through an Internet connection via a mobile device or other computing devices. At 104, an OTT system (e.g., a network provider server) can determine a location of the device during the OTT session. The location can be determined by a variety of methods, including receiving GPS data from a GPS sensor of the device, determining an Internet Protocol (IP) Address of the device, performing network-based triangulation of the device, utilizing WiFi-based positioning data, and so forth. Once the location of the device is determined, a FIPS code or other location identifier that corresponds to the device location may be assigned to the OTT session. In other exemplary embodiments, other location identifiers can be utilized such as a geographic names information system (GNIS) code may be used to identify the location of the OTT session.

At 106, the OTT system can compare the device location's FIP code (e.g., a state and county identifier) to account information of the user (or associated with the device). For example, the account information can be directed to a home address for the user. The home address can be based on the billing address provided to the OTT media content service provider. When the user is watching the OTT session at or in proximity to the home, the FIPS location will match the user's account location. Otherwise, the OTT system can determine that the user is watching the OTT away from the home location. In some embodiments, the user's account information may include additional information such as the names and devices associated with sub-accounts for the OTT media content account of the user. For example, the account may be based out of the user's office address.

At 108, if the device (during the OTT session) is in the FIPS region for the account's home location, the OTT system can provide EAS messages for that FIPS location. At 110, the system can provide EAS messages to the OTT system for the current location of the device during OTT viewing session when the device is remote from the home location. For example, the location of the device during the OTT viewing session can be changing, such as when the user is in transit. For instance, the OTT viewing session can take place while the user is in a moving vehicle on a mobile communications device or a laptop computing device. In addition, the OTT system can receive EAS messages for other locations, such as locations that are associated with other devices of the user and/or associated with other individuals that are associated with the user. At 112, these additional EAS messages for other locations may be provided to other communications devices associated with the user and/or with the other users.

Figure 2:
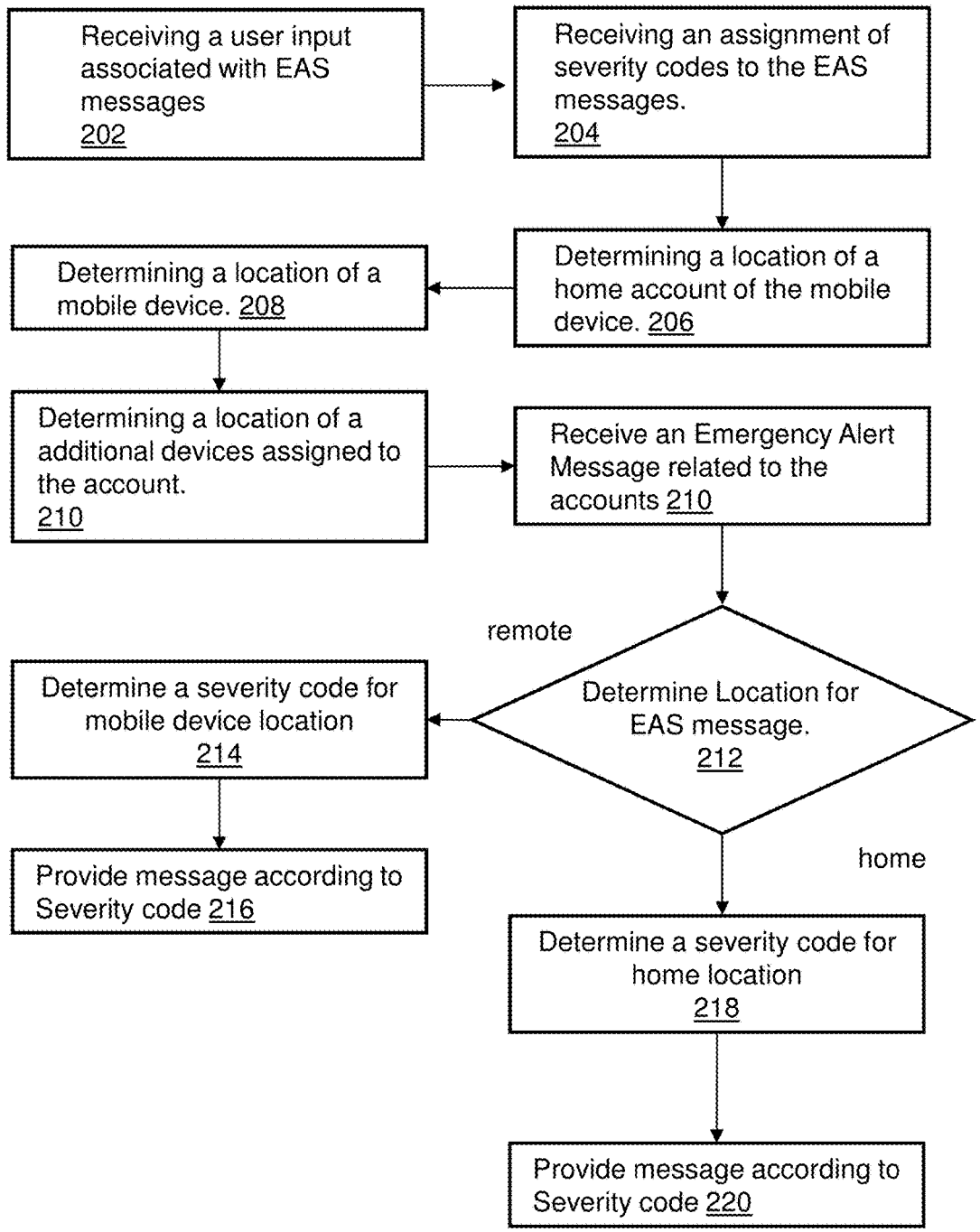
FIG. 2 depicts an illustrative embodiment of a method for delivering emergency alert messages to device(s) associated with a user's device.

FIG. 2 depicts an illustrative embodiment of a method 200 for delivering emergency alert messages to accounts associated with the user. At 202, a user input is received regarding EAS messages. For example, the user can be presented with a series of options for responding to EAS messages. For instance, a main user of an account, such as the person who pays for the OTT services, can set up notifying features for his devices and/or for devices of his family/friends. In some embodiments, the main user can identify each communication device (including fixed and/or mobile devices) that should receive specific alerts in the event an EAS message is received for the FIPS region in which the particular device is located. The user input can be received by the OTT system and stored, such as with other subscriber account information (e.g., in an HSS server). In one embodiment, the user input can be provided at any time and at multiple times, such as when a user is setting up their account or when the user descries to adjust there account.

At 204, the system can receive an assignment of severity codes for the EAS messages. In one embodiment, the assignment of the severity codes can be included in the user input at 202. For example, the main account user can decide which person should be alerted in the event that an EAS message is received for the area associated with a sub-account. For instance, a parent may be concerned that a child is traveling in an area that has a high likelihood of tornadoes or flooding. In that event, the parent can decide to create high priority severity codes for the children in the event that a tornado or flood warning EAS message is received for the area in which the children are located, based on the location of a mobile communication device of the child.

Referring additional to FIG. 3, an illustrative embodiment of severity codes and related actions is illustrated according to method 200. Table 300 shows an exemplary assignment of severity codes for users in response to various types of EAS messages. Depending on the EAS message's event code, the communication action can be determined based on the severity code for that event code and the user. For example, a user "A" could be a younger child who is travelling through an area with high occurrences of flooding, tornadoes, or other natural disasters. The severity codes for user "A" are assigned to various emergency events that could be identified in an EAS message for a location in which the user "A" is travelling. In the event of an emergency that prompts an EAS message for that location, the severity code thereof can initiate a communication action by the OTT system. For example, for high priority severity codes, the OTT system can initiate a phone call (e.g., a recorded or voice synthesized call) or another type of communication session (e.g., a text message) between a device of a main account user and a device of a sub-account user or other users immediately upon receiving the EAS message.

In other examples, a medium severity code related to an EAS message can result in a text message or instant message (IM) session being initiated between the devices of the main user of the account and other sub-accounts. In other examples, low priority severity codes could result in the event being ignored or other less instantaneous communications being established, such as sending an email.

Returning to FIG. 2, at 206, a home location associated with the mobile device or OTT services account is determined. Next, at 208, a current location of a mobile device is determined. For example, this is can be the location of a current user of the system or the main account holder. The locations can be determined by any number of methods. For instance, a GPS locator can be used in the mobile device. In another example, the home location can be simply determined based on profile information of the account holder in the OTT system. At 210, the locations of various mobile devices and other computing devices of sub-accounts can be located. For example for each mobile communication device (e.g., users "A" and "B" of FIG. 3), their location can be determined via an internal GPS device and these locations can be reported to a network server or directly to the main account's mobile device or computing device.

At 210, upon receipt of an EAS message for any of the accounts associated with the system, it can be determined for whom the EAS message is relevant based on their locations. At 212, it is determined whether the EAS message is intended for the home location or for a remote location, such as a mobile device in transit. At 214, if the EAS message is for a remote location, the severity code for the user of the remote device can be determined according to the event code contained in the EAS message. At 216, the remote communications device is alerted according to the instructions provided for that user's severity code, as illustrated for example in FIG. 3. At 218, the home location is alerted through the OTT system being used in the home location or via a variety of available communication devices and computing devices in or near the home location. Thus, each cell phone of the user in proximity to the home location, as well as computing devices physically located in or near the home location, along with set-top boxes or any other media devices, can be alerted according to the rules for the users and devices in that location. These alerts can also be adjusted according to the type of device presenting the alert, the type of alert (e.g., the severity code designated to the alert) or other factors.

Figure 4:
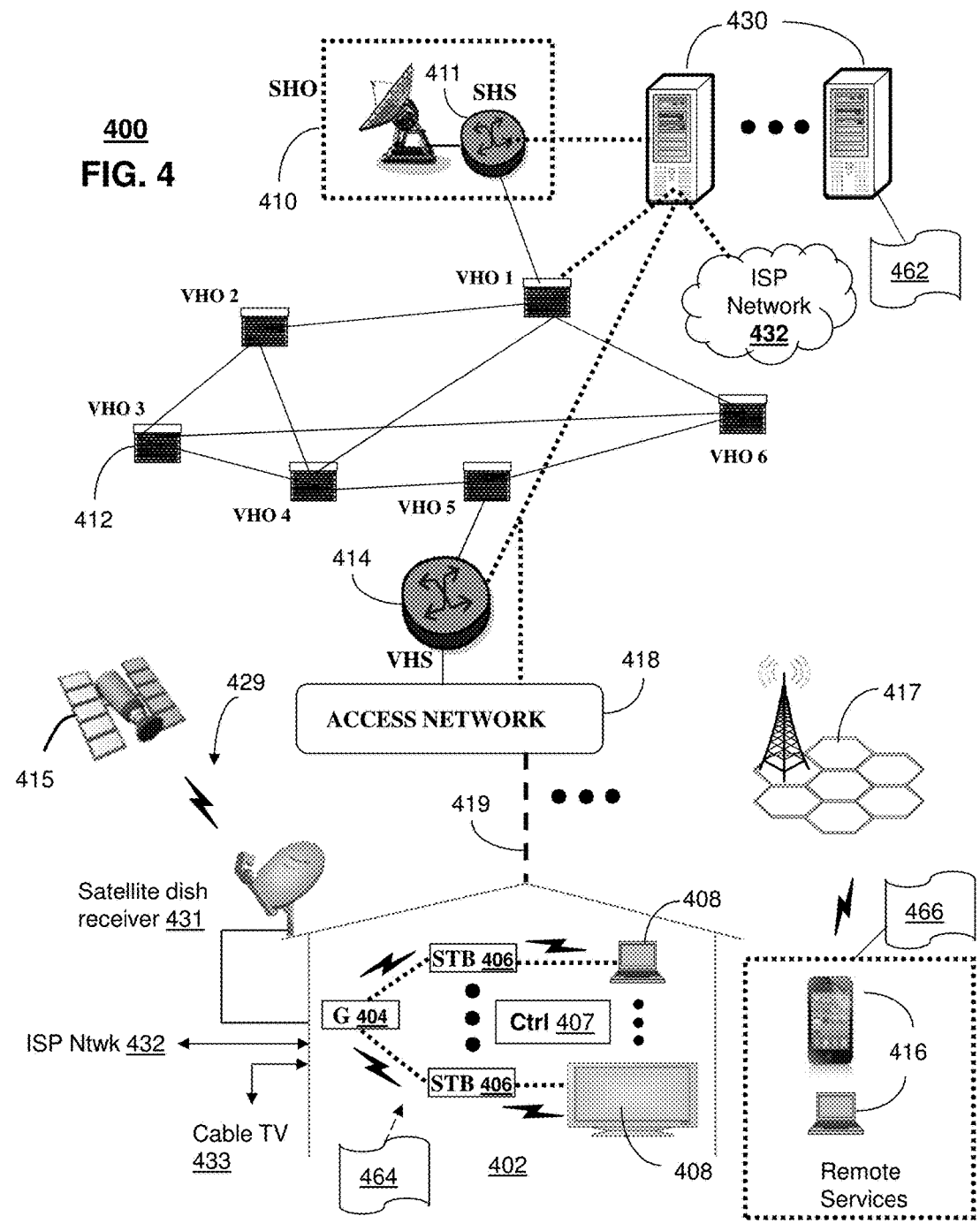
FIG. 4 depicts an illustrative embodiment of communication systems that provide communication services including over-the-top media services.

FIG. 4 depicts an illustrative embodiment of a communication system 400 for delivering media content. The communication system 400 can represent an interactive television system such as an Internet Protocol Television (IPTV) media system. Communication system 400 can be overlaid or operably coupled with other systems described with respect to methods 100 and 200 of FIGS. 1 and 2 as another representative embodiment of communication system 400.

As an example, one or more devices illustrated in the communication system 400 of FIG. 4 can receive, over a network, user input associated with a group of emergency alert service messages, assign a plurality of severity codes to the group of emergency alert service messages according to the user input, where each of the plurality of severity codes indicates a presentation format. The communication system 400 can also determine a first location of a mobile communication device, determine a second location of a premises of a user of the mobile communication device, responsive to detecting a first emergency alert service message associated with the first location: determine a first severity code of the plurality of severity codes assigned to the first emergency alert service message, and provide the first emergency alert service message to the mobile communication device for presentation during a communication session in a first format according to the first severity code. The communication system 400 can also, responsive to detecting a second emergency alert service message associated with the second location and responsive to determining that the second location is remote from the first location: determine a second severity code of the plurality of severity codes assigned to the second emergency alert service message, and provide the second emergency alert service message to the mobile communication device for presentation in a second format according to the second severity code.

The communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system. Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as an over-the-top content (OTT) provider (herein referred to as OTT provider equipment 430). The OTT provider equipment 430 can use computing and communication technology to perform functions 462 including the delivery of OTT content from a content source, which can include among other things, the techniques of monitoring for and providing of EAS messages as described in FIGS. 1 and 2. For instance, OTT content delivery 462 of OTT provider equipment 430 can be similar to the functions described providing EAS messages of FIGS. 1 and 2. The media processors 406 and wireless communication devices 416 can be provisioned with OTT player applications 464 and 466, respectively, to utilize the services of OTT provider equipment 430. For instance, OTT player applications 464 and 466 of media processors 406 and wireless communication devices 416 can be similar to the functions described for local and mobile playback of OTT content as described in FIGS. 1 and 2. These functions 464, 466 can also include integrating the EAS message into the OTT session based on presentation instructions associated with a designated severity code, as well as enabling trick play or other presentation control functions during presentation of the EAS message (e.g., pausing the presentation of the OTT content, adjusting the audio of the OTT content, and so forth).

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
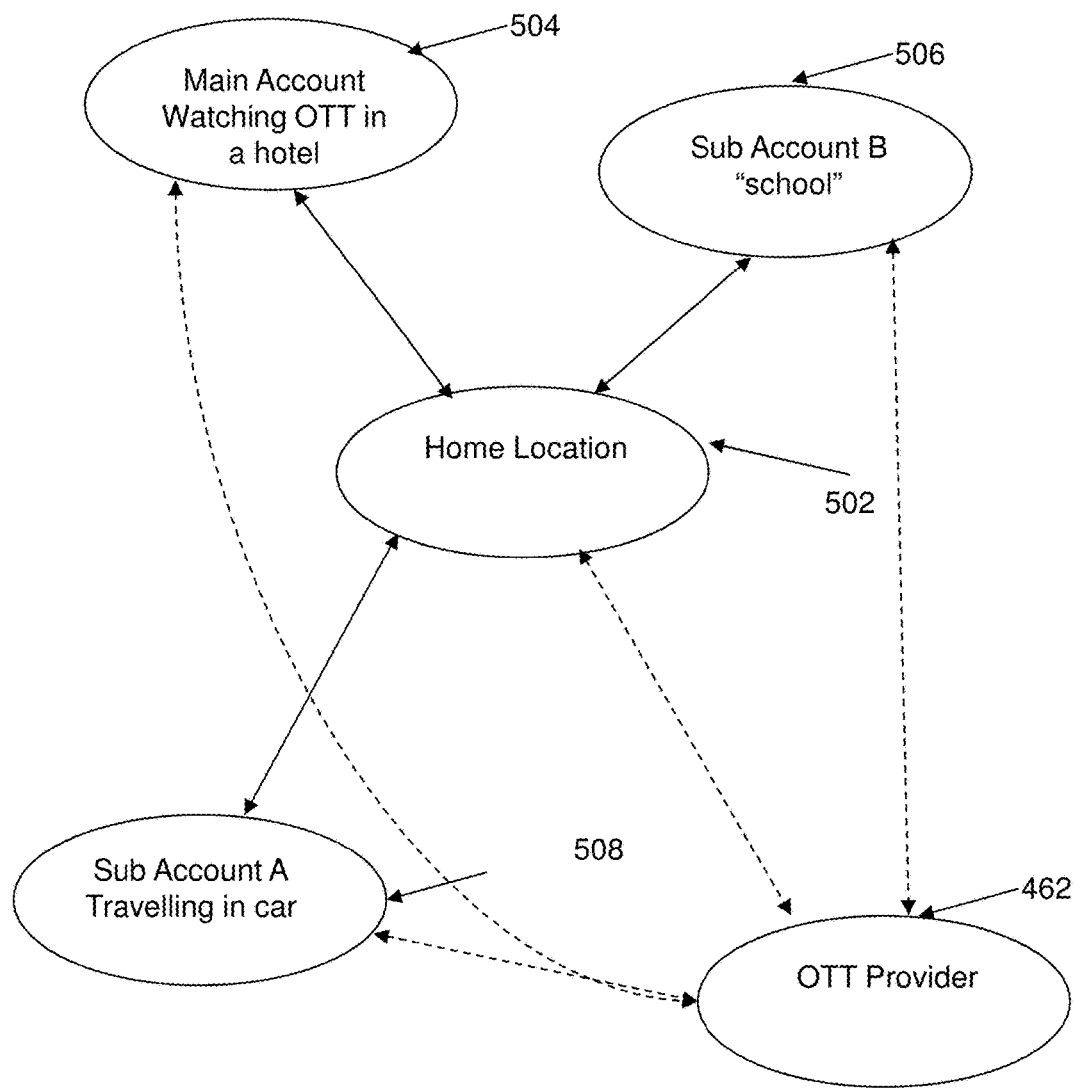
FIG. 5 depicts an illustrative embodiment of connected users employing the system of FIG. 4 and portions of the methods of FIGS. 1-2.

FIG. 5 depicts an illustrative embodiment of system 500 in which a portable computing device 504, associated with a main account that has a home location 502, is associated with other devices in the account for the purposes of providing EAS messages to the various sub-accounts related to the main account. For example, in the home location, a gaming device may have an OTT player application installed thereon. The gaming device can be stationary and typically does not leave the home location. In one embodiment, upon receiving an EAS message during an OTT media content viewing session, the playback features of the OTT device can be paused or otherwise suspended until the viewer has acknowledged the EAS message. For example, the user may be required to respond via text, instant message, or phone call to unpause or unlock the OTT session.

On the other hand, the portable computing device 504 of the main account holder can be with a user during business travel where the device 504 is presenting OTT media content. Mobile device 506 can be associated with a sub-account for user "B". User "B" and the mobile device 506 could be located at a school, for example, during the day. Similarly, another mobile device 508 can belong to user "A". In this example, user "A" is travelling in a car. Mobile device 508 can update its location information (e.g., periodically or continuously) to thereby receive an EAS message that is relevant to the location of mobile device 508.

Each of the devices in FIG. 5 can be in communication with the OTT provider equipment 430 of FIG. 4. In other embodiments, the connection can be by way of a server or computing device other than an OTT service provider, such as a standalone server that provides (e.g., as a dedicated device) the functionality of method 200 of FIG. 2. For example, as user "A" moves, the mobile device 508 can update OTT Provider equipment 430 with the location. Similarly, as User "B" moves from location to location throughout the day, the mobile device 506 can update its location with OTT Provider equipment 430. Similarly, the location of the main account holder can be updated, such as via location information or communication access requests through computing device 504. Upon receiving an EAS alert that is relevant for any of the devices on the account, OTT Provider equipment 430 can alert the appropriate devices with messages as determined by the severity codes for that user.

Figure 6:
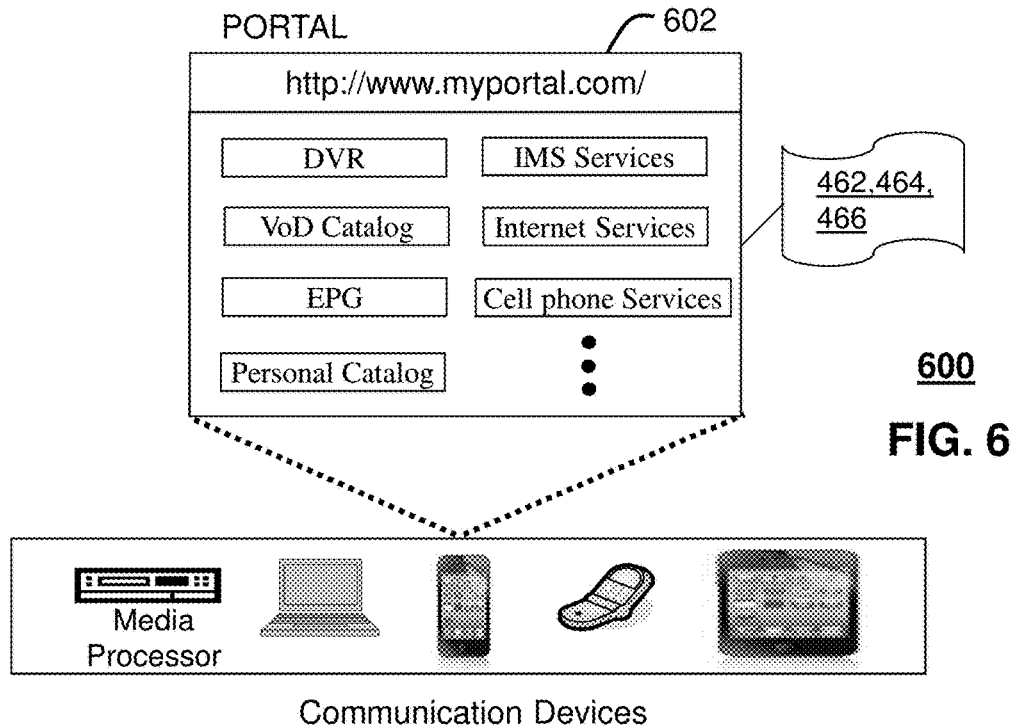
FIG. 6 depicts an illustrative embodiment of a web portal for interacting with communication systems of over-the-top media servers including the system of FIG. 5.

FIG. 6 depicts an illustrative embodiment of a web portal 602 of a communication system 600. Communication system 600 can be overlaid or operably coupled with methods 100 and 200 of FIGS. 1 and 2 and communication system 400 as another representative embodiment of methods 100 and 200 of FIGS. 1 and 2 and communication system 400. The web portal 602 can be used for managing services of methods 100 and 200 of FIGS. 1 and 2 and communication system 400. A web page of the web portal 602 can be accessed by a Uniform Resource Locator (URL) with an Internet browser using an Internet-capable communication device such as those described in as providing remote OTT services in methods 100 and 200 of FIGS. 1 and 2 and FIG. 4. The web portal 602 can be configured, for example, to access a media processor 406 and services managed thereby such as a Digital Video Recorder (DVR), an OTT application and media player, a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision OTT player applications 464 and 466 to adapt these applications as may be desired by subscribers and/or service providers of methods 100 and 200 of FIGS. 1 and 2, and communication system 400. For instance, users of an OTT provider equipment 430 can log into their on-line accounts and provision OTT provider equipment 430 with the ability to monitor for and provide OTT content delivery 462 and EAS messages to various remote computing devices associated with an account, and so on. Service providers can log onto an administrator account to provision, monitor and/or maintain their settings as shown in FIG. 3 or other OTT services provided by OTT provider equipment 430. Use of web portal 602 by the user can enable generating table 300 in which users, event codes, severity codes and/or communication actions are designated or otherwise associated with each other. In one or more embodiments, particular event codes can have a minimum communication action associated with it. For example, the web portal 602 may not permit event codes associated with a tornado to be designated as ignore.

Figure 7:
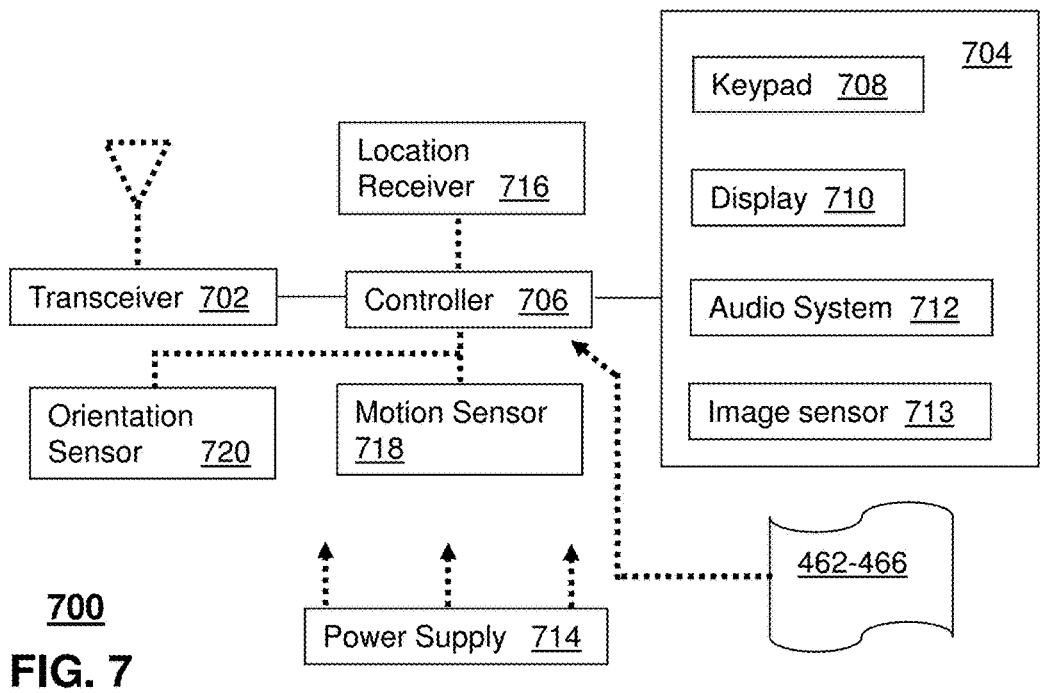
FIG. 7 depicts an illustrative embodiment of a communication device that can employ the emergency alert service described in the methods of FIGS. 1 and 2.

FIG. 7 depicts an illustrative embodiment of a communication device 700. Communication device 700 can serve in whole or in part as an illustrative embodiment of the methods depicted in FIGS. 1 and 2 and equipment of the communication system of FIG. 4. Communication device 700 enables providing OTT communication sessions and providing EAS messages during an OTT communication session where the EAS message is associated with one or both of the device's location or a location associated with a premises of the user of the device. The communication device 700 can also adjust the presentation of the EAS message according to presentation parameters (e.g., full screen text message with audio while pausing content presentation, semi-transparent banner text message with no audio, and so forth) designated in a severity code which has been associated with the particular EAS alert.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1λ, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of methods 100 and 200 of FIGS. 1 and 2, the media processor 406, the media devices 408, or the portable communication devices 416 of FIG. 4, as well as the OTT players 464 and 466. It will be appreciated that the communication device 700 can also represent other devices that can operate in providing the steps of methods 100 and 200 of FIGS. 1 and 2 and communication system 400 of FIG. 4 such as a gaming console and a media player. In addition, the controller 706 can be adapted in various embodiments to perform the providing OTT services 462.

Upon reviewing the aforementioned embodiments, it would be evident to an artisan with ordinary skill in the art that said embodiments can be modified, reduced, or enhanced without departing from the scope of the claims described below. For example, exemplary systems may employ monitoring of all EAS messages to determine relevancy to any person of interest to the users of the system. The system may be able monitor social media accounts of these users to determine their locations as well as to determine the existence of other emergency situations not yet reported by the EAS. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
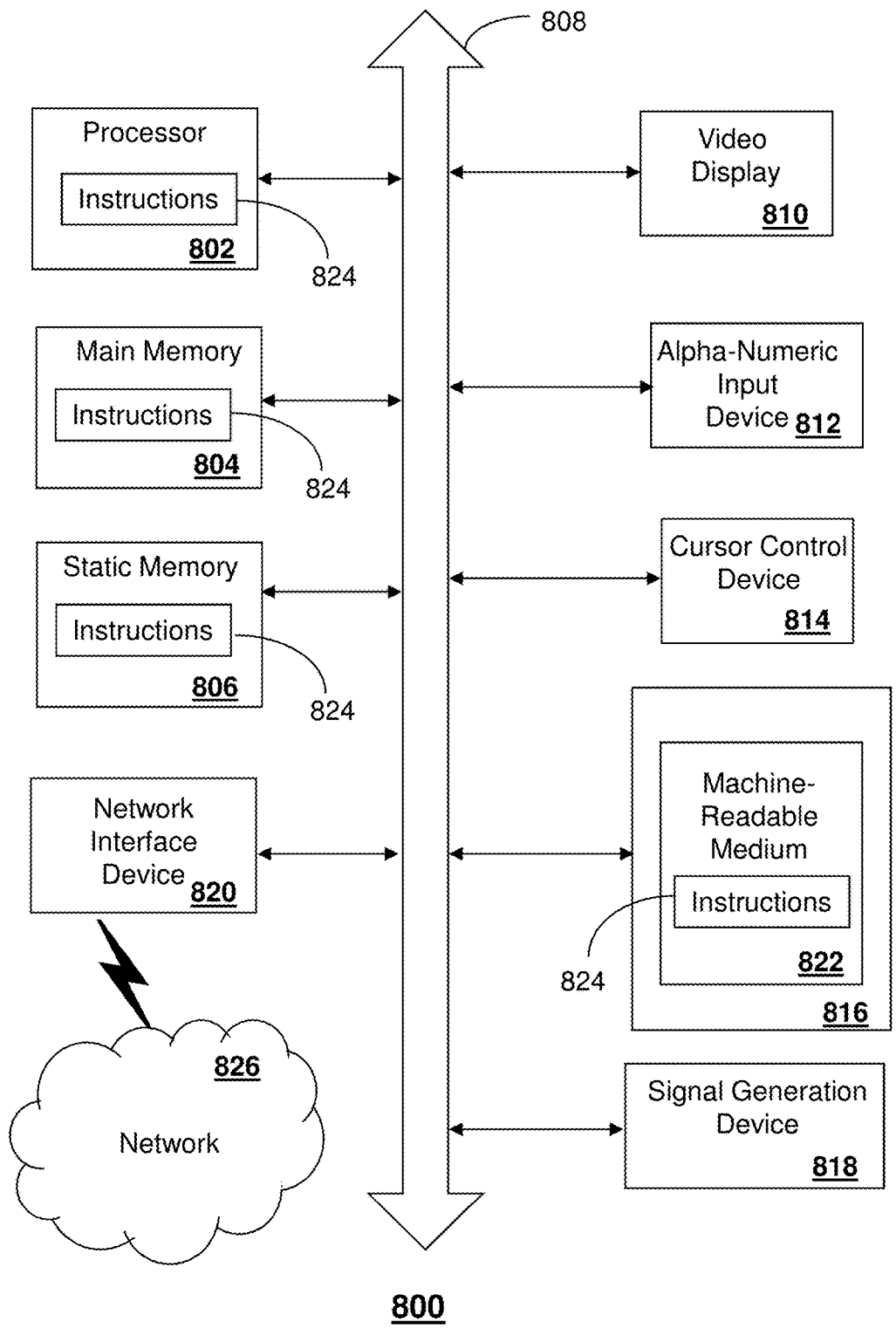
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as an OTT provider equipment 430 in determining how to provide EAS alerts or in various OTT player applications on mobile devices and computing devices 464 and 466. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
   a processing system including a processor; and
   a memory that stores executable instructions that, when executed by the processing system, facilitate performance of operations, comprising:
      detecting a first emergency alert service message associated with a location of a mobile communication device;
      obtaining a first severity code of a plurality of severity codes assigned to the first emergency alert service message, wherein the plurality of severity codes are obtained for a group of emergency alert service messages, and wherein each of the plurality of severity codes describes a presentation format responsive to detecting the first emergency alert service message;
      providing the first emergency alert service message to the mobile communication device for presentation in a first format according to a first presentation format of the first severity code responsive to detecting the first emergency alert service message;
      detecting a second emergency alert service message associated with a location of a premises of a user of the mobile communication device when the location of the premises is remote from the location of the mobile communication device, wherein the second emergency alert message is related to the first emergency alert message based on an emergency type and based on a relationship between the location of the mobile communication device and the location of the premises;
      obtaining a second severity code of the plurality of severity codes assigned to the second emergency alert service message responsive to detecting the second emergency alert service message; and
      providing the second emergency alert service message to the mobile communication device for presentation in a second format according to a second presentation format of the second severity code responsive to detecting the second emergency alert service message.

2. The system of claim 1, wherein the operations further comprise, responsive to the detecting of the first emergency alert service message associated with the location of the mobile communication device and responsive to determining that the location of the mobile communication device is proximate to the location of the premises, providing the first emergency alert service message to a second communication device located in the premises for presentation by the second communication device.

3. The system of claim 2, wherein the providing of the first emergency alert service message to the second communication device located in the premises is performed according to the first severity code.

4. The system of claim 2, wherein the second communication device comprises one of a landline telephone and a set top box.

5. The system of claim 1, wherein the operations further comprise:
   determining that a second communication device is associated with the mobile communication device;
   determining a location of the second communication device; and
   responsive to the first or second severity codes indicating that second party is to be notified, providing one of the first or second emergency alert service messages to the second communication device.

6. The system of claim 5, wherein the operations further comprise providing, via a text message, one of the first or second emergency alert service messages to the second communication device.

7. The system of claim 1, wherein the first severity code pauses a content presentation during presentation of the first emergency alert service message, and
   wherein the providing of the first emergency alert service message to the mobile communication device causes the mobile communication device to pause a communication session of the mobile communications device.

8. The system of claim 7, wherein the content presentation comprises an over-the-top content viewing session from an over-the-top service.

9. The system of claim 1, wherein the operations further comprise:
   assigning a plurality of response codes to a plurality of communication devices that are associated with the mobile communication device, wherein each of the plurality of response codes defines a type of emergency alert service message to be forwarded to each of the plurality of communication devices; and
   providing one of the first or second emergency alert service messages to a respective one of the plurality of communication devices according to the plurality of response codes.

10. A method, comprising:
   determining, by a processing system including a processor, a location of a mobile communication device and a location associated with a premises of a user of the mobile communication device;
   determining, by the processing system, a first user assigned severity code for a first emergency alert service message;
   determining, by the processing system, a second user assigned severity code for a second emergency alert service message;

providing, by the processing system, the first emergency alert service message to the mobile communication device for presentation during a communication session in a first format according to the first user assigned severity code responsive to detecting a first emergency alert service message associated with the location of the mobile communication device; and providing, by the processing system, the second emergency alert service message to the mobile communication device for presentation during the communication session in a second format according to the user assigned severity code responsive to detecting the second emergency alert service message associated with the location of the premises and responsive to determining that the location of the premises is different from the location of the mobile communication device, wherein the second emergency alert message is related to the first emergency alert message based on an emergency type and based on a relationship between the location of the mobile communication device and the location of the premises.

11. The method of claim 10, further comprising responsive to the detecting of the second emergency alert service message associated with the location of the mobile communication device and responsive to determining that the location of the mobile communication device is proximate to the location of the premises providing the second emergency alert service message to a second communication device located in the premises for presentation by the second communication device.

12. The method of claim 11, wherein the providing of the second emergency alert service message to the second communication device located in the premises is according to an authorization indicated in the second user assigned severity code.

13. The method of claim 11, wherein the second communication device comprises one of a landline telephone and a set top box, and wherein the second communication device comprises a hardwire connection to the Internet.

14. The method of claim 10, further comprising:
receiving, by the processing system via a network, user input associated with a group of emergency alert service messages; and
assigning, by the processing system, a plurality of user assigned severity codes to the group of emergency alert service messages according to the user input, each of the plurality of user assigned severity codes indicating a presentation format.

15. The method of claim 14, wherein the group of emergency alert service messages includes the emergency alert service message, and wherein the plurality of user assigned severity codes includes the user assigned severity code.

16. The method of claim 10, further comprising:
assigning a plurality of response codes to a plurality of communication devices that are associated with the mobile communication device, wherein each of the plurality of response codes defines a type of emergency alert service message to be forwarded to each of the plurality of communication devices; and
providing the emergency alert service messages to one of the plurality of communication devices according to one of the plurality of response codes.

17. The method of claim 16, wherein the providing of the emergency alert service message to the one of the plurality of communication devices is performed via a text message.

18. A non-transitory, machine-readable storage medium, comprising executable instructions that, when executed by a processing system including a processor, facilitate performance of operations, comprising:
receiving a first emergency alert service message associated with a location of a mobile communication device, the location of the mobile communication device being remote from a location of a premises of a user of the mobile communication device;
presenting the first emergency alert service message during a communication session in a first format, wherein the first format is based on a first severity code that is assigned to the first emergency alert service message according to user input; and
determining a second severity code that is assigned to a second emergency alert service message according to the user input responsive to receiving the second emergency alert service message associated with the location of the premises of the premises of the user of the mobile communication device,
wherein the second emergency alert message is related to the first emergency alert message based on an emergency type and based on a relationship between the location of the mobile communication device and the location of the premises.

19. The non-transitory, machine-readable storage medium of claim 18, wherein the operations further comprise:
providing the user input associated with a group of emergency alert service messages, wherein the user input enables a system to assign a plurality of severity codes to the group of emergency alert service messages; and
presenting the second emergency alert service message during the communication session in a second format, wherein the second format is based on the second severity code.

20. The non-transitory, machine-readable storage medium of claim 18, wherein the operations further comprise providing the user input associated with a group of emergency alert service messages, wherein the user input enables a system to assign a plurality of severity codes to the group of emergency alert service messages, and
wherein each of the plurality of severity codes indicates a second communication device to receive notice of any of the group of emergency alert service messages.

* * * * *